May 22, 1956  P. J. BILY  2,746,773
SAFETY FITTING FOR FLUID HANDLING STRUCTURE
Filed Oct. 6, 1951
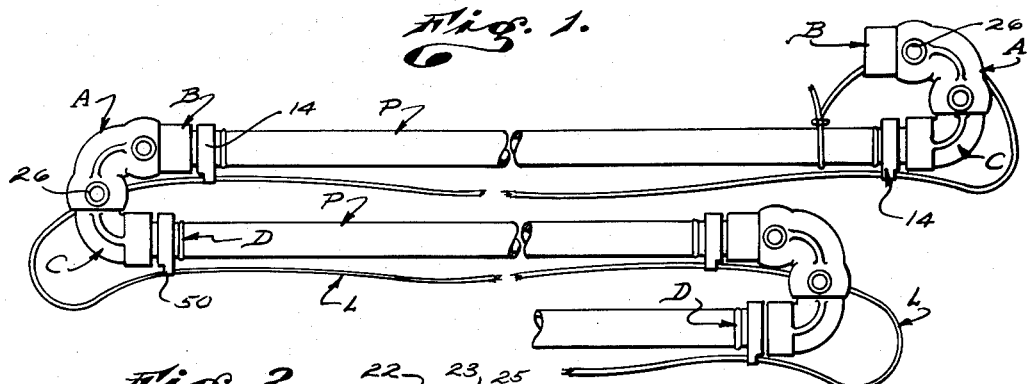
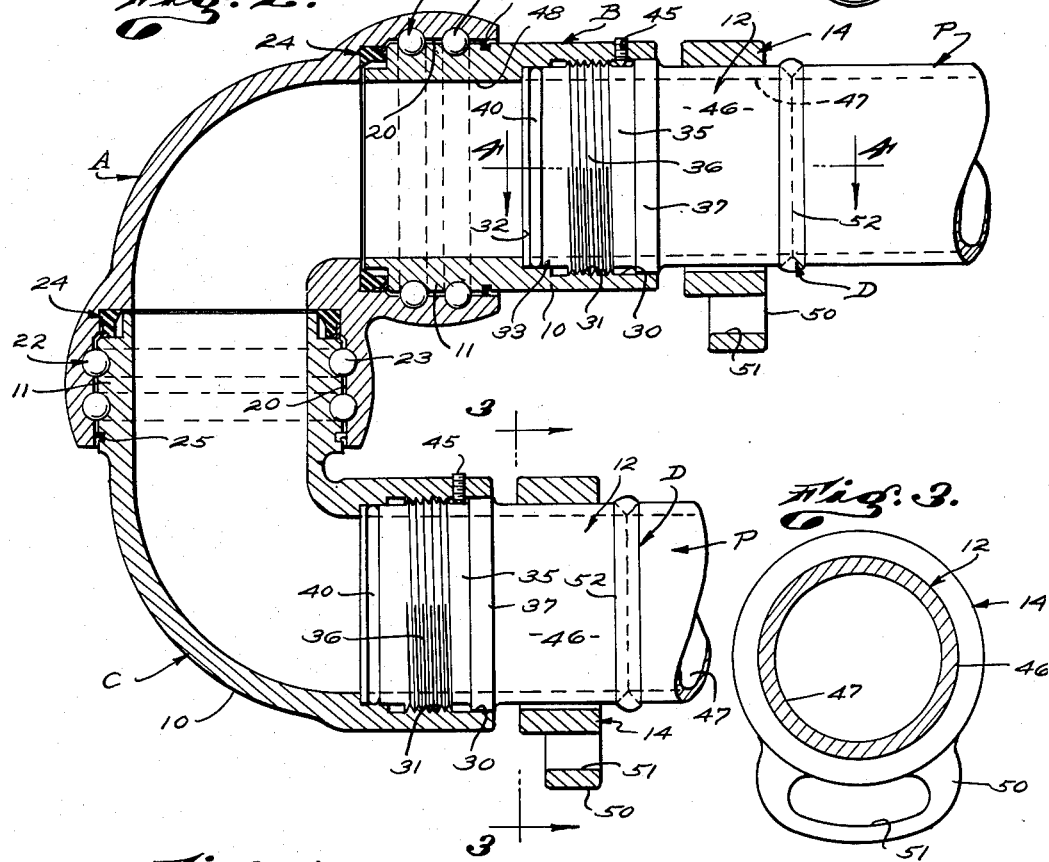
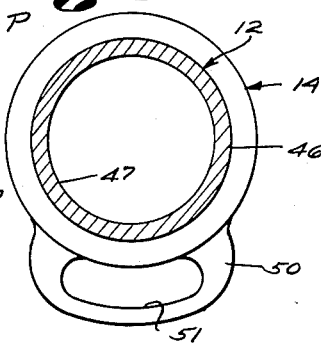
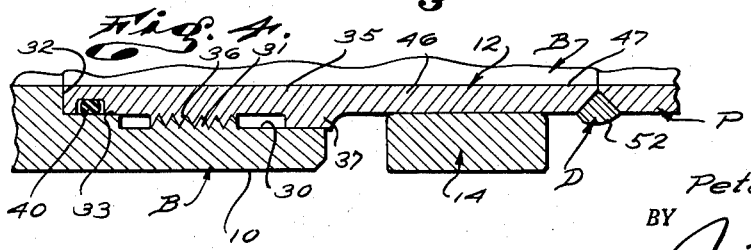
INVENTOR.
Peter J. Bily
BY
Attorney

United States Patent Office 2,746,773
Patented May 22, 1956

2,746,773
SAFETY FITTING FOR FLUID HANDLING STRUCTURE

Peter J. Bily, Brea, Calif., assignor to Chiksan Company, Brea, Calif., a corporation of California Application October 6, 1951, Serial No. 250,085

1 Claim. (Cl. 285—1)

This invention relates to a fluid handling structure and it is a general object of the invention to provide a structure adapted to be applied to or combined with a pipe and which involves sections rotatably connected to provide a swivel connection, there being a collar rotatably carried by one of the sections and adapted to handle a safety line.

Swivel joints or connections are frequently provided on pipe sections or the like and in many situations high pressures are handled by such structures, making it advantageous to employ safety lines securing the parts together or in an assembly to prevent serious damage in the event that there should be failure or separation of parts. A typical situation of this kind is one wherein a plurality of pipe lengths are joined by swivel connections, providing an elongate fluid handling duct of general flexibility and serving, in effect, as a hose. In such structures it is desirable, and in many instances important, that a safety line extend longitudinally of the duct, and provision is made for connecting the line to the duct at points spaced longitudinally thereof.

It is a general object of this invention to provide a construction applicable to or combined with a pipe and including joint sections connected together to rotate relative to each other, one of the sections having an extension rotatably supporting a line receiving collar.

Another object of this invention is to provide a joint of the general character referred to wherein one section has a body and an extension screw threaded to the body, which extension rotatably carries the collar which handles the safety line.

It is another object of this invention to provide a joint construction of the general character referred to applicable to a pipe by a pipe connecting means which serves to retain the line carrying collar on the extension of the joint.

The construction provided by the present invention in a form suitable for connecting pipes may include an L-shaped corner section, a straight or plain end section, and an L-shaped end section. In a typical case the corner section may have socket openings at its ends and the end sections have bodies with pin portions that are rotatably retained in the socket openings of the corner section. Each end section has an extension screw-threaded to the body section and sealing means and lock means seal and secure the extensions to the bodies. Collars are rotatably carried on the extensions of the end sections and the pipes are joined to the terminal ends of the extensions by pipe connections, preferably welding, the welding material being built up so that the pipe connections retain the collars on the extensions.

The various objects and features of my invention will be fully understood from the following detailed description of a typical preferred form and application of the invention, throughout which description reference is made to the accompanying drawings, in which:

Fig. 1 is an elevation illustrating a flexible duct that includes a plurality of pipes joined end to end by joint structures embodying the present invention, there being a safety line extending longitudinally of the duct and secured thereto at the connections between the pipes. Fig. 2 is a sectional view illustrating a joint construction embodying the invention showing it connecting two pipes. Fig. 3 is a transverse sectional view taken as indicated by line 3—3 on Fig. 2, and Fig. 4 is an enlarged sectional view of a portion of the structure taken as indicated by line 4—4 on Fig. 2.

In a typical adaptation of the invention it is incorporated in joints used in connection with pipes P. In the drawings I have illustrated several pipes P and joints embodying the invention are employed connecting the pipes in an elongate series to form a fluid handling duct. In the particular case illustrated each joint includes two line carrying collars and a safety line extends longitudinally of the duct and is connected thereto by means of the collars.

The particular joint construction illustrated in the drawings, and best illustrated in Fig. 2, involves, generally, a corner section A and two end sections, one a straight nipple section B, the other an L-shaped end section C. The end section B has a body 10 with a pin portion 11 connected to the corner section A, and it has an extension 12 screw-threaded to the body 10. The corner section C has a body 10 with a pin portion 11 connected with the corner section A and an extension 12 screw threaded to the body. A line carrying collar 14 is rotatably carried on each extension and a pipe P is connected to the terminal end of each extension by a pipe connection D.

The corner section A in the case illustrated in the drawings is a simple L-section with a socket opening 20 extending into it from each end. The pin portion 11 of body 10 of end section B enters one socket 20 and is rotatably retained therein by anti-friction bearing means 22. In the case illustrated the bearing means 22 involves two annular series of balls 23 carried in registering grooves in the pin 11 and socket portion of section A. A suitable sealing means 24, preferably in the form of an annular sealing ring, seals between the pin portion 11 of section B and the portion of the section A. In the case illustrated a second or outer seal 25 is provided between the parts just mentioned. An access opening 26 is provided in the side of the socket portion of section A providing access to the grooves that carry the balls 23, the opening 26 being normally closed by a suitable closure or plug.

In the case illustrated the body 10 of section B projects a substantial distance from the socket portion of section A and is provided at its outer or projecting end with a socket opening 30. The socket opening 30 is provided intermediate its ends with a thread 31 and is provided adjacent its bottom 32 with a cylindrical portion 33 of reduced diameter.

The extension 12 of the end section B has a pin portion 35 that enters the socket 30, and a thread 36 on the pin portion 35 is cooperatively engaged with the thread 31 in the socket. A collar or shoulder 37 on the pin portion 35 is spaced from the thread 36 and slidably fits into the outer end portion of the socket opening 30. The tip or terminal end portion of the pin portion 35 is slidably engaged in the reduced portion 33 of the socket 30. A sealing means is provided between the pin portion 35 of the extension 12 and the body 10 and is preferably in the form of a sealing ring 40 carried by the terminal end portion of the pin section 35, and having sealing engagement with the reduced bore 33. In the case illustrated the sealing ring 40 is of the O type. A suitable lock means is preferably provided for securing the pin portion 35 in the socket opening 30, and in the case illustrated the lock involves a lock or set screw 45 carried by the body 10 and engaged with the pin portion 35 between the thread 36 and the collar 37.

The extension 12 has a portion 46 projecting from or beyond the collar 37 and, in practice, the exterior of portion 46 is turned or plain and carries the collar 14. The opening or fluid handling passage 47 provided in the extension 12 continues longitudinally through the extension from one end to the other and is preferably of the same size as the fluid passage 48 provided in the body 10.

The collar 14 is carried on the portion 46 of extension 12 to be freely rotatable thereon, and in practice it is desirable that the portion 46 of the extension be somewhat longer than the collar, as shown in the drawings. The collar 14 in the case illustrated is a simple, annular member or ring with a boss 50 projecting from one side, the boss being provided with an aperture or opening 51 to accommodate the safety line L.

A pipe P opposes the terminal end of the extension 12 and the pipe connecting means D joins the pipe P to the portion 46 of extension 12. In the preferred form of the invention the connecting means D involves a body 52 of welding material applied to the extension 12 and pipe P so that these parts are integrally joined. The body 52 of welding material is built up so that it projects outwardly from or beyond the exterior of the portion 46 of the extension at the terminal end of the extension and thus serves as a stop positively preventing displacement of the collar 14 from the portion 46 of extension 12. It will be observed from the drawings that the collar 14 is confined between the end of the body 10 or between the collar 37 and the body of welding 52, so that it cannot become displaced from the extension 12.

The connection provided between the pin portion 11 of end section C and the corner section A may involve anti-friction bearing means 11 and sealing means 24 corresponding to the structure hereinabove described. Further, the L-shaped body 10 of end section C carries the extension 12 through a structure corresponding to that hereinabove described, that is, the extension 12 has a pin portion 35 projecting into a socket 30 in the body 10. The pin section 35 is held in the socket 30 by threaded engagement and a sealing ring 40 seals between the parts while a lock screw 45 prevents separation of the parts. On the projecting portion 46 of the extension 12 on body 10 there is a collar 14, the same as that above described, and this collar is retained by pipe connecting means D as hereinabove described.

With the construction described the two pipes P are joined by the coupling for free rotation about axes that are normal to each other, and two collars 14 are carried by the coupling. The safety line L is preferably engaged through or with both of the collars 14 and thus provides a connection between the joined pipes rendering the structure safe, even though failure might occur in parts of the joint.

Having described only a typical preferred form and application of the invention, I do not wish to be limited or restricted to the specific details herein set forth, but wish to reserve to myself any variations or modifications that may appear to those skilled in the art and fall within the scope of the following claim:

Having described my invention, I claim:

A safety fitting for connecting a length of pipe to a swivel joint and for retaining adjacent the swivel joint a safety cable extending past the juncture of said pipe and joint, comprising a tubular nipple, externally threaded means at one end of the nipple for securing the same to one end of the swivel joint, a shoulder integral with said nipple and projecting radially outward therefrom in axially spaced relation to the threaded end of the nipple, the other end of the nipple being disposed in axial abutting relation to an end of the length of pipe, welding material integrally uniting said nipple and length of pipe and projecting radially outward from the exterior surface of the nipple and forming a permanent circumferential abutment on said other end of the nipple, a safety cable retaining collar loosely encircling said nipple between said shoulder and abutment, the internal circumference of said collar being substantially less than the external circumference of said shoulder and abutment whereby on separation of said nipple from said swivel joint, said collar will be retained upon said nipple between said shoulder and said abutment.

References Cited in the file of this patent

UNITED STATES PATENTS

| | | |
|---|---|---|
| 648,187 | Bright | Apr. 24, 1900 |
| 757,313 | Joynt | Apr. 12, 1904 |
| 1,938,829 | Hamer | Dec. 12, 1933 |
| 1,939,936 | Walker | Dec. 19, 1933 |
| 1,972,084 | Bogart | Sept. 4, 1934 |
| 2,150,221 | Hinderliter | Mar. 14, 1939 |